United States Patent
Robertson et al.

(10) Patent No.: US 6,956,344 B2
(45) Date of Patent: Oct. 18, 2005

(54) HIGH AVAILABILITY FAN SYSTEM

(75) Inventors: Naysen J. Robertson, Orangevale, CA (US); Ricardo Ernesto Espinoza-Ibarra, Carmichael, CA (US); Sachin Navin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/698,904

(22) Filed: Oct. 31, 2003

(65) Prior Publication Data

US 2005/0093500 A1 May 5, 2005

(51) Int. Cl.⁷ .............................. H02K 1/00; F04B 49/00
(52) U.S. Cl. .................. 318/538; 318/34; 318/445; 417/16; 416/159; 416/160; 416/162; 236/DIG. 9
(58) Field of Search ................. 417/16, 17, 2, 417/42, 32, 423.7, 319, 5, 246, 247, 338, 417/343; 318/538, 563, 568.24, 625, 440, 318/34–113, 445; 310/112; 416/1, 70 A, 416/115, 171, 120–130, 155–162, 170 R, 416/30, 32, 33, 62, 72, 77, 160, 169 R, 246, 416/159; 236/49.5, DIG. 9

(56) References Cited

U.S. PATENT DOCUMENTS

| | | | | |
|---|---|---|---|---|
| 2,936,107 A | * | 5/1960 | Blackburn | 417/205 |
| 3,477,637 A | * | 11/1969 | Johnson | 417/363 |
| 4,352,635 A | * | 10/1982 | Saunders | 417/16 |
| 5,008,561 A | * | 4/1991 | Madeley et al. | 307/80 |
| 5,436,827 A | * | 7/1995 | Gunn et al. | 700/82 |
| 5,759,016 A | * | 6/1998 | Bernhardt et al. | 417/374 |
| 5,938,407 A | * | 8/1999 | Garrett | 417/16 |
| 6,040,668 A | * | 3/2000 | Huynh et al. | 318/471 |
| 6,400,045 B1 | * | 6/2002 | Hosokawa et al. | 307/117 |
| 6,626,653 B2 | * | 9/2003 | Lin et al. | 417/423.5 |
| 6,819,017 B2 | * | 11/2004 | Winkel et al. | 310/59 |
| 2005/0095138 A1 | * | 5/2005 | Robertson et al. | 417/16 |

* cited by examiner

Primary Examiner—Marlon T. Fletcher
Assistant Examiner—Patrick Miller

(57) ABSTRACT

A fan motor assembly with integrated redundant availability is recited. The fan motor assembly can include a fan motor subassembly with a first fan motor and a second fan motor, and a fan motor selector mechanism coupled to the fan motor subassembly, so that the fan motor selector mechanism selectively couples the first fan motor or second fan motor to a fan. The fan motor assembly can also include a control unit coupled to the fan motor selector mechanism, wherein the control unit is configured to control the fan motor selector mechanism such that either of the first fan motor and second fan motor is selectively engaged to the fan.

19 Claims, 6 Drawing Sheets

HIGH AVAILABILITY FAN SYSTEM

TECHNICAL FIELD

Embodiments of the present invention relate to a method and apparatus for increasing the availability of a fan system via the use of redundant drive motors.

BACKGROUND ART

Electronic equipment often require extra cooling to transfer and dissipate the heat generated by the various components such as microprocessors, and the most commonly used mechanism for removing heat from a product such as a computer or server is via a motor-driven fan. In a single-motor fan assembly, the motor is a single point of failure. Often, when a fan fails, the computer must be shut down so that overheating does not occur, which would further damage high heat-producing components like the microprocessor. Alternatively, the computer may continue operating, but at a reduced capacity (e.g., reducing the processor speed to prevent overheating). Most fan failures are caused by motor failure.

Computers designed for high availability service, such as servers, add extra fans to compensate for the possibility of a fan failure. This prior art cooling system design paradigm increases the overall server cost in several ways: increased cost for a complete additional fan or fans, increased use of scarce real estate in the packaging with consequent limitations on design and layout options, and increased demand for power management subsystems. The need for additional space for the extra fan(s) will affect the thermodynamic cooling process, since the airflow will be different when driven from various locations in the packaging. When the fan system is configured so that two or more fans are in line axially, a further degradation of cooling effectiveness occurs because of the reduced airflow caused by the blockage of a failing or non-operating fan being in the way of the operating fan. In some cases, two fans may be operative at the same time, thus requiring synchronization systems. Thus the increased availability from prior art fan systems comes with various other costs, additional design burdens, or impairments to the overall product design.

DISCLOSURE OF THE INVENTION

In one embodiment, the invention recites a fan motor assembly with redundant availability. The fan motor assembly comprises a fan motor subassembly with a first fan motor and a second fan motor, and a fan motor selector mechanism coupled to the fan motor subassembly, so that the fan motor selector mechanism selectively couples the first fan motor or second fan motor to a fan. The fan motor assembly further comprises a control unit coupled to the fan motor selector mechanism, wherein the control unit is configured to control the fan motor selector mechanism such that either of the first fan motor and second fan motor is selectively engaged to said fan.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Embodiments of the present invention facilitate redundant cooling capability without the need for multiple fan assemblies. For example, a failing fan motor can be disengaged from the fan and replaced while a redundant motor takes up driving the fan, thus minimizing the impact to the normally sustained airflow within the system enclosure. In other words, reduced system performance and fan performance are minimized when a fan motor fails.

Figure 1:
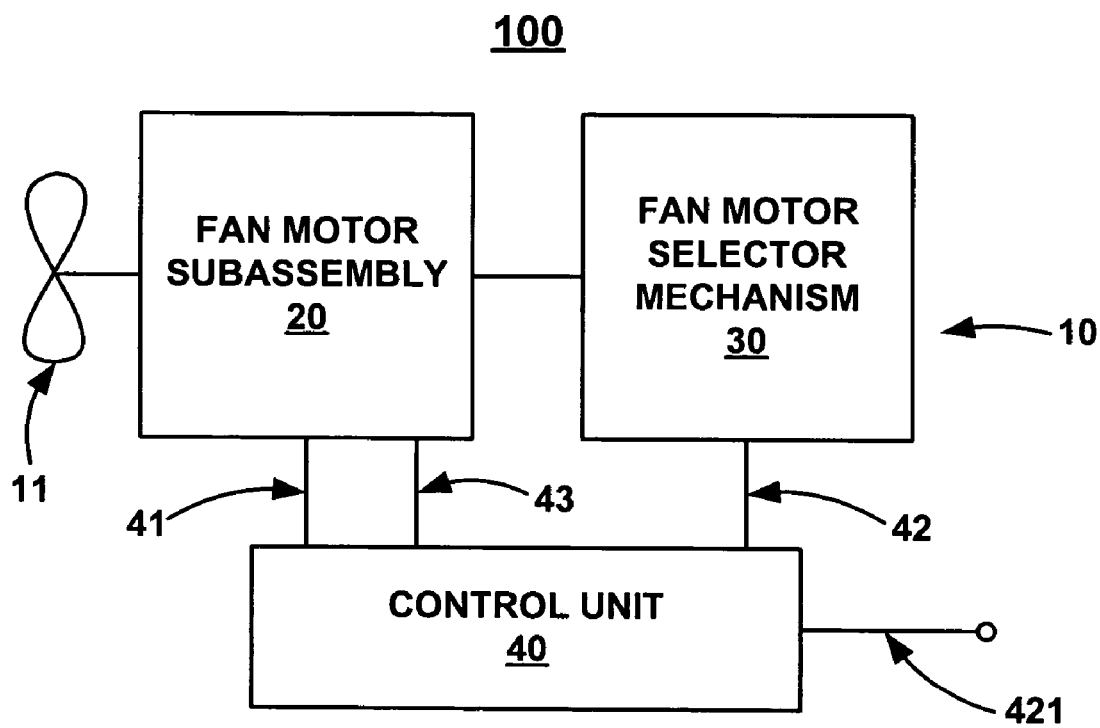
FIG. 1 shows a fan motor assembly with redundant availability, consisting of a fan motor subassembly, a fan motor selector mechanism, and a control unit in accordance with embodiments of the present invention.

FIG. 1 shows an embodiment of a fan motor assembly 100 in accordance with the present invention. In the embodiment of FIG. 1, fan motor assembly 100 comprises a fan motor subassembly 20, a fan motor selector mechanism 30, and a control unit 40. In one embodiment, the fan motor subassembly integrates a plurality of fan motors on a replaceable assembly and selectively couples the fan motors to the fan 11 via drive gears. The gears (not shown) are mounted to the shafts of the fan and fan motors, respectively. The fan motors are mounted on moveable platforms or other suitable mounting systems to permit rapid and easy transition from a first fan motor position, engaged to the fan, to another (e.g., disengaged) fan motor position. A second fan motor is then moved from a disengaged fan motor position to an engaged fan motor position to drive the fan. This is advantageous in that a second fan is not necessitated in order to provide redundant fan capacity for cooling equipment. Thus, air flow is not blocked or altered by a non-operating fan in the system additional space is not needed for the additional fan.

Figure 2:
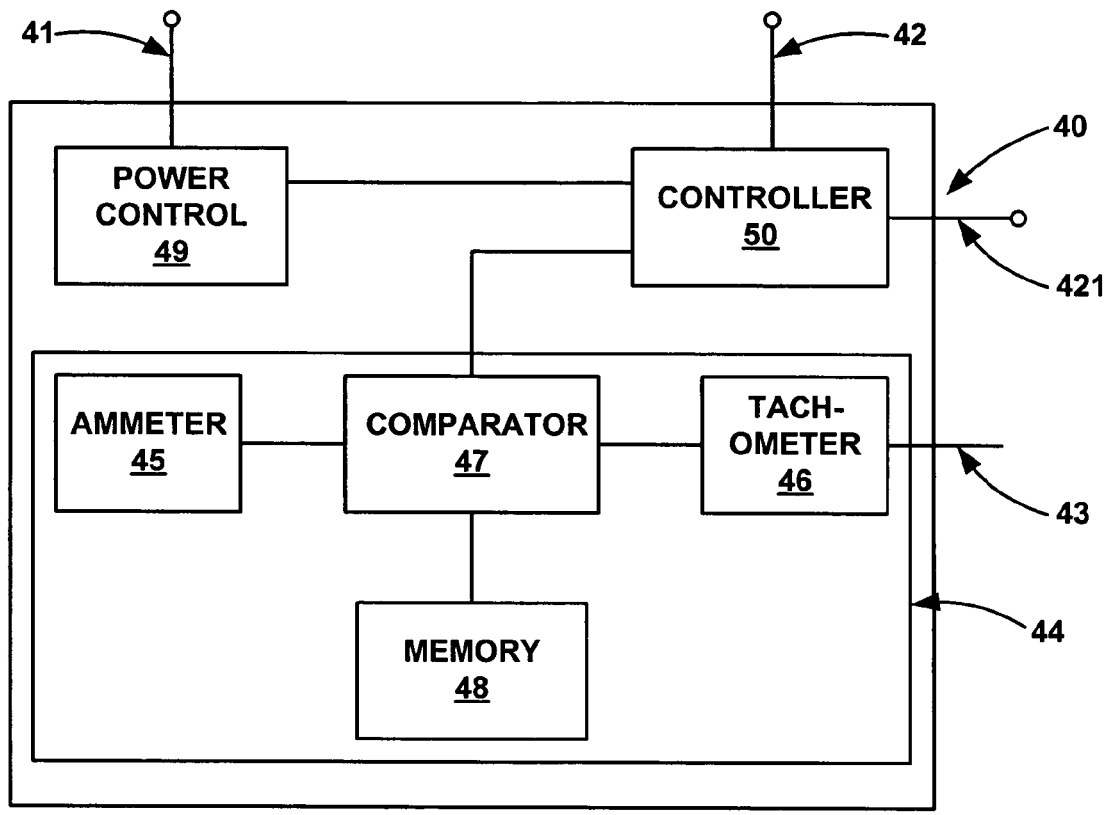
FIG. 2 shows a control unit for an integrated, redundant high availability fan system in accordance with embodiments of the present invention.

FIG. 2 shows a control unit 40 for an integrated, redundant high availability fan system in accordance with embodiments of the present invention. In embodiments of the present invention, the control system 40 monitors the active fan motor performance based on fan motor speed and/or fan motor current consumption. When at least one of these performance metrics exceeds a threshold indicating either a failure condition, or the approach of a failure condition, the control unit activates a transfer from the failing motor to another replacement motor. In one embodiment, control unit 40 shuts off power to the failing first motor, initiates a command to the fan motor selector mechanism 30 to move that first motor out of contact with the fan drive gear, and initiates another command to move the second motor into position so that its drive gear is engaged with the drive gear on the fan shaft.

In the embodiment of FIG. 2, control unit 40 comprises a performance-monitoring module 44, a controller 50, and a power control subsystem 49. In one embodiment, performance-monitoring module 44 comprises a current measuring device 45, and a tachometer 46 coupled with a comparator 47 and a memory 48. Tachometer 46 monitors, via coupling 43, the revolutions per minute of the currently engaged fan motor or of fan 11 itself, depending on where the tachometer sensor is located. In one embodiment, the measurement for tachometer 46 is measured from the shaft of the fan (e.g., shaft 316 of FIG. 3C). Current measuring device 45 measures the passing through the power control module 49 to the active and operating motor of fan motor assembly 100. These current measurements are delivered to comparator 47 which then compares them with a set of stored performance metrics (e.g., stored in memory 48) that indicate either a failure condition, or the approach of a failure condition, of fan motor assembly 100. Controller 50 monitors the results delivered from comparator 47, and delivers commands to the power control subsystem 49 and the fan selector mechanism 30. In one embodiment, controller 50 also delivers status reports and accepts commands from a connection 421 to a network (not shown).

In embodiments of the present invention, controller 50 comprises a microprocessor suitable for simple commands based on a few inputs, with ROM and RAM for executing commands based on inputs received via connection 421, inputs from the comparator 47, and/or from normal initialization when first powered on. In one embodiment, memory 48 may also store executable instructions for controller 50.

In embodiments of the present invention, when fan 11 begins to fail, the rotational speed measured by tachometer 46 drops. Thus, one metric for indicating failure is that the speed of shaft 316 monitored by tachometer 46 falls below a specified level. Another metric indicating failure or impending failure is that the current, measured by current measuring device 45, being drawn by the fan motor deviates from normal operating range by going over or falling below set thresholds. Either one or both metrics can be employed to deliver a failed condition signal from the comparator 47 to the controller 50. Upon receipt of such an indication of failure or incipient failure, the controller 50 initiates a series of commands (described earlier) to automatically effect a transition from a first motor driving fan 11 to a second motor. In one embodiment, the decrease in fan speed below a specified threshold is used to trigger a transition from a first fan motor to a second fan motor. In another embodiment, an increase/decrease in fan motor current drain above/below a specified threshold is used to trigger a transition from a first fan motor to a second fan motor. In another embodiment, a combination of decrease in fan speed and an increase/decrease in fan motor current drain is used to trigger a transition.

Figure 3A:
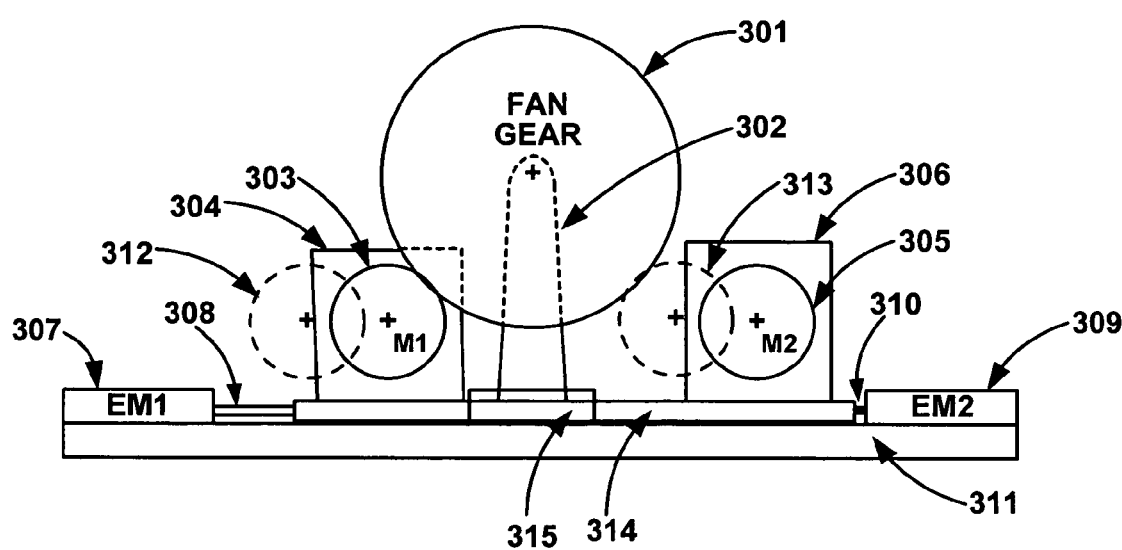
FIG. 3A is a front view of a fan motor assembly in accordance with embodiments of the present invention.
Figure 3B:
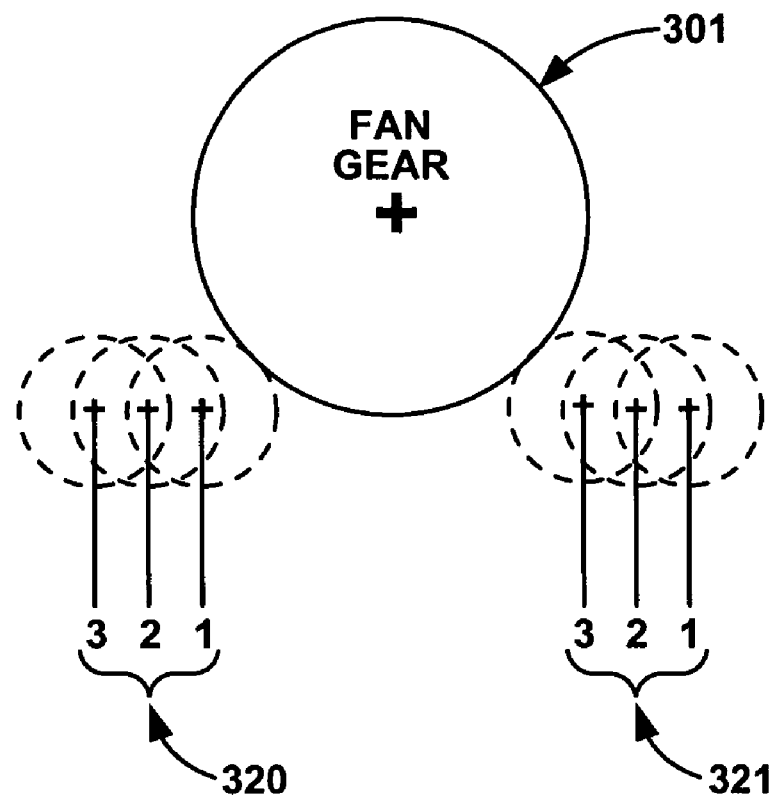
FIG. 3B shows the relative position of a first fan motor and a second fan motor during the various stages of engagement, disengagement, and a neutral position in accordance with embodiments of the present invention.
Figure 3C:
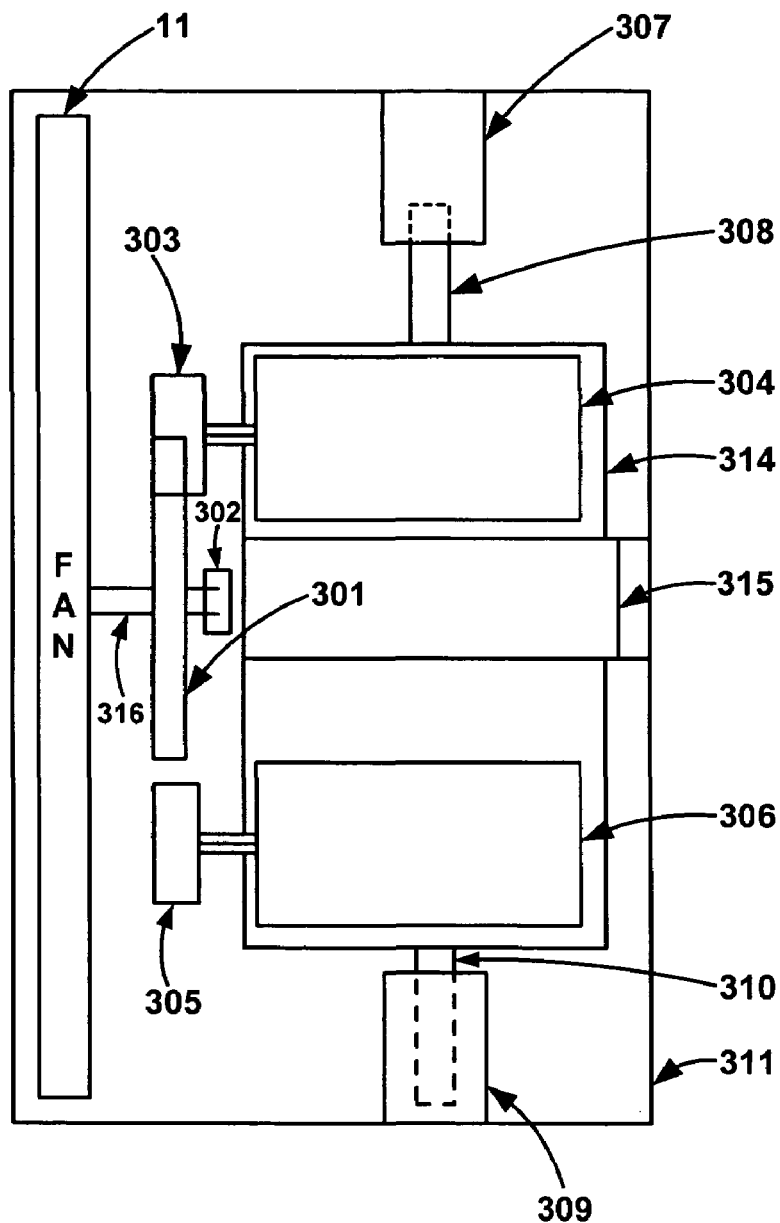
FIG. 3C is a top view of a fan motor assembly showing the relative position of the fan motors, the various gears, and the fan motor selector mechanism in accordance with embodiments of the present invention.

FIGS. 3A and 3C show a front and a top view respectively of a fan motor selector mechanism 30 in accordance with embodiments of the present invention. In the embodiment of FIG. 3A, the fan motor selector mechanism 30 comprises a moveable platform 314 supported by a fixed platform 311. Moveable platform 314 supports two fan motor subassemblies. In the present embodiment, a fan motor subassembly comprises a fan motor (e.g., fan motors 304 and 306) coupled with a fan motor drive gear (e.g., fan motor drive gears 303 and 305). In the embodiment of FIG. 3A, fan motor selector mechanism 30 further comprises a pair of electromagnetic actuators (e.g., electromagnetic actuators 307 and 309) which move the moveable platform 314 back and forth using actuator arms 308 and 310 respectively, thus selectively engaging one fan motor drive gear (e.g., fan motor drive gear 303) to fan gear 301 while disengaging the other fan motor drive gear (e.g., fan motor drive gear 305) from fan gear 301. In the embodiment of FIG. 3A, fan gear 301 is coupled via a fan drive shaft (e.g., 316 of FIG. 3C) to a support structure 302 which secures the fan (e.g., fan 11 of FIG. 1) to the moveable platform 314. While the present embodiment recites coupling fan 11 with a fan motor using drive gears, embodiments of the present invention are well suited for using other coupling mechanisms such as a clutch plate mechanism, an idler gear mechanism, etc. In embodiments of the present invention, other support elements may be employed in addition to those depicted in FIGS. 3A and 3C. In the embodiment of FIG. 3A, a stabilizing retainer bracket 315 is used to ensure that moveable platform 314 travels along a straight line fixed path to ensure that the fan motor drive gears 303 and 305 engage fan gear 301.

In embodiments of the present invention, moveable platform 314 is configured to accept and retain the fan motors (e.g., 304 and 306) via a snap-in mechanism that positions the fan motors in a proper position. With the fan motors in the correct position, the fan motor drive gears (e.g., 303 and 305) can engage fan gear 301 upon being transported to the correct location via the moveable platform 314.

In the embodiment of FIG. 3A, fan motor drive gear 303 is engaged with fan gear 301 while fan motor drive gear 305 is disengaged from fan gear 301. For example, upon initial startup of fan motor assembly 100, the controller 50 commands power controller 49 to activate electromagnet 307, thus extending actuator arm 308 and pushing platform 314 so that motor drive gear 303 engages fan gear 301.

Alternatively, control unit 40 can cause electromagnetic actuators 307 and/or 309 to cause moveable platform 314 to be moved to a second position wherein motor drive gear 305 of fan motor subassembly 306 is moved to position 313 and engages fan gear 301. For example, upon detection of a failing or failed motor, the controller 50 commands power control subsystem 49 to terminate the power to the electromagnetic actuator 307 and shuts off the power to fan motor 304. Controller 50 then commands the power control subsystem 49 to activate electromagnet 309, thus extending actuator arm 310 and pushing platform 314 so that fan motor drive gear 305 engages fan gear 301. Controller 50 then commands the power control subsystem 49 to switch on the power to fan motor 306 so that the fan 11 is driven by fan motor 306.

In embodiments of the present invention, the two electromagnet actuators can be configured to move the fan motors to a neutral position where no drive to the fan is provided, for purposes of maintenance beyond just replacement of a failed motor. These three positions for fan motor 304 are depicted in group 320 of FIG. 3B as positions 1 (engaged), 2 (neutral), and 3 (disengaged). Also in FIG. 3B, the relative positions for fan motor 306 are shown in group 321 as positions 1 (disengaged), 2 (neutral), and 3 (engaged). While the present embodiment recites electromagnetic actuators, embodiments of the present invention are well suited for using other mechanisms for selectively engaging fan motor 304 and 306. For example, a third motor (not shown) may be used to move the fan motors so that either fan motor drive gears 303 or 305 engage fan gear 301. In another embodiment, the active fan motor is used as a drive mechanism. For example, in one embodiment, upon determining the failure of fan motor 304, fan motor 306 is activated with relatively low power and/or low speed. Fan motor drive gear 305 may engage with teeth disposed upon fixed platform 311 so that upon activation, fan motor 306 is moved from a disengaged position to an engaged position. Other embodiments may utilize drive belts or chains to selectively engage the fan motors with fan 11.

In embodiments of the present invention, other mechanisms can be configured to selectively couple a first fan motor subassembly or a second fan motor subassembly into a position to drive fan 11 via a gear engagement system. For example, a gear drive mechanism with an idler gear can be configured to move between fan motor drive gears 303 and 305 while still maintaining engagement with fan drive gear 301.

Figure 4:
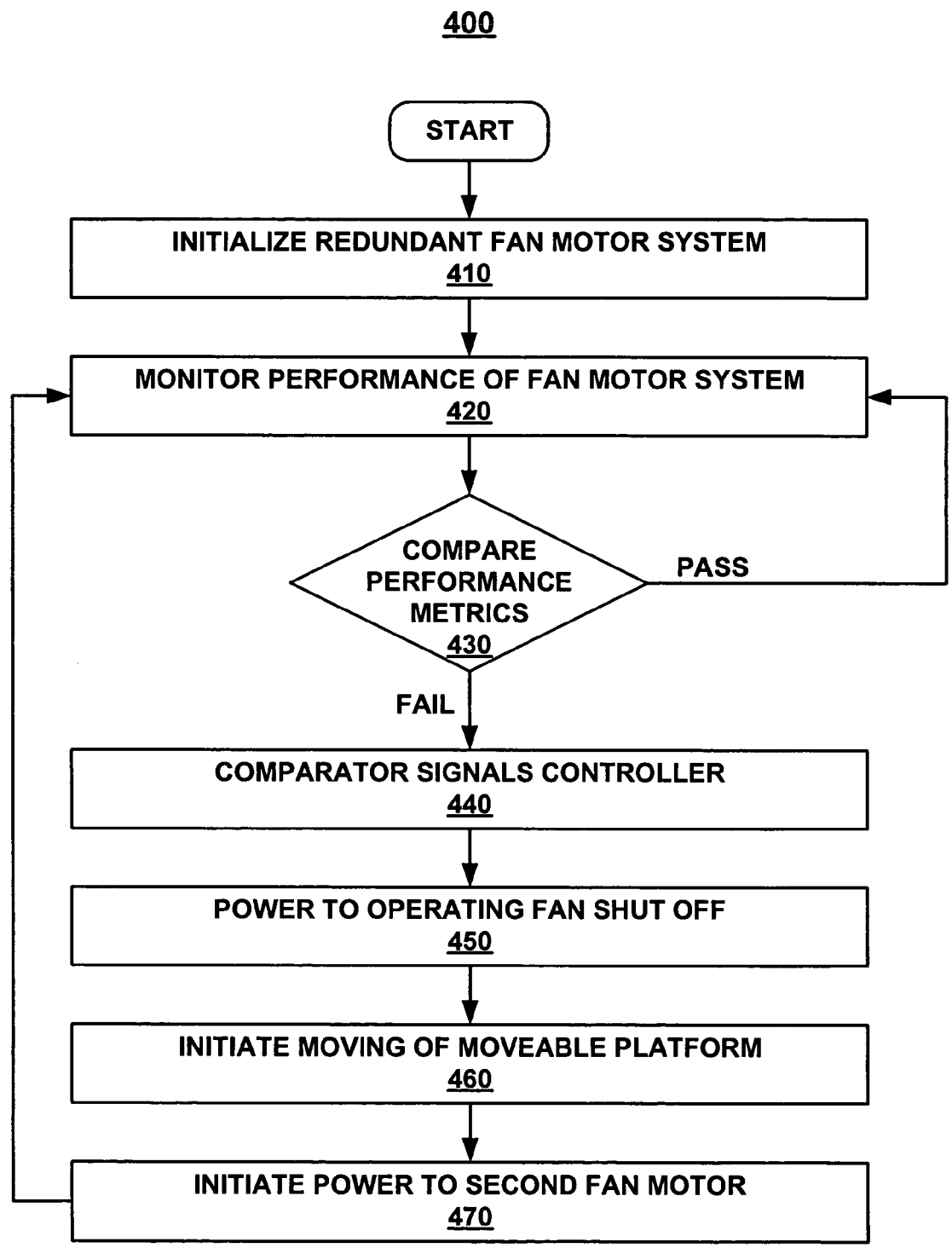
FIG. 4 is a flow chart of a method for providing redundant availability in a fan system in accordance with embodiments of the present invention.

FIG. 4 is a flow chart of a method 400 for providing redundant availability in a fan system in accordance with embodiments of the present invention. In step 410 of the present embodiment, the redundant fan motor system (e.g., fan motor assembly 100 of FIG. 1) is initialized (powered on). Control unit 40 automatically selects a predetermined position for fan motor selector mechanism 30 and activates the appropriate electromagnetic actuator (e.g., electromagnetic actuator 307 of FIG. 3A) to move the sliding platform 314 into the desired position. In one embodiment, the designated first motor (e.g., fan motor 304 of FIG. 3A) is selected and moved into position to drive fan 11. Additionally, control unit 50 powers on fan motor 304.

In step 420 of the present embodiment, control unit 50 begins to monitor the speed of fan 11 via tachometer 46, after waiting a suitable time to let the fan motor come to its rated speed. In one embodiment, control unit 40 periodically checks the speed and the current drain of the working fan motor according to a pre-determined interval actuated by controller 50. In one embodiment, this rate is once per second, but any rate suitable for the application is feasible.

In step 430 of the present embodiment, a logical operation is performed in which comparator 47 tests the measured data against predetermined threshold data stored in memory 48 for these motors. If the measured data is within acceptable parameters, flow chart 400 returns to step 420. However, upon detection of a threshold event, such as a decrease in motor speed below a specified level, an increase/decrease in current drain above/below a specified level, or a combination of these two events, flow chart 400 proceeds to step 440.

In step 440 of the present embodiment, comparator 47 sends a signal to controller 50 indicating that a failure of the current fan drive motor subassembly has occurred or is imminent.

In step 450 of the present embodiment, controller 50 commands power control subsystem 49 to turn off the power to the first motor.

In step 460 of the present embodiment, controller 50 commands power control subsystem 49 to turn off power to the first electromagnetic actuator (e.g., electromagnetic actuator 307 of FIG. 3A) and to turn on power to the second electromagnetic actuator (e.g., electromagnetic actuator 309 of FIG. 3A) to move the moveable platform 314 from a first position to a second position, thus bringing the second fan motor drive gear (e.g., fan motor drive gear 305 of FIG. 3A) into contact with the fan drive gear (e.g., fan drive gear 301 of FIG. 3A).

In step 470, controller 50 commands power control subsystem 49 to turn on power to the second motor (e.g., fan motor 306 of FIG. 3A). Control unit 40 then begins monitoring the performance of the second motor. In one embodiment, controller 50 can send a status report to a remote monitoring system informing it of a failure of the motor via connection 421. In one embodiment of the present invention, flow chart 400 returns to step 420 upon completing step 470.

An integrated, redundant high availability redundant fan motor system configured to provide a high availability fan system has been described. While the present invention has been described in particular embodiments, it should be appreciated that the present invention should not be construed as limited by such embodiments, but rather construed according to the following claims.

What is claimed is:

1. A fan motor assembly with integrated redundant availability, said fan motor assembly comprising:
   a fan motor subassembly comprising a first fan motor and a second fan motor;
   a fan motor selector mechanism coupled to said fan motor subassembly, said fan motor selector mechanism configured to selectively couple said first fan motor or said second fan motor to a fan;
   a control unit coupled to said fan motor selector mechanism, said control unit configured to control said fan motor selector mechanism such that either of said first fan motor and said second fan motor is selectively engaged to said fan.

2. The fan motor assembly of claim 1 wherein said fan motor subassembly is removably coupleable to said fan motor assembly.

3. The fan motor assembly of claim 1 wherein said fan motor subassembly is selectively driven by either said first fan motor or said second fan motor.

4. The fan motor assembly of claim 1 wherein said control unit further comprises:
   a fan motor performance monitoring unit configured to determine a performance characteristic of said first fan motor.

5. The fan motor assembly of claim 4 wherein said fan motor performance monitoring unit comprises:
   a tachometer configured to determine the rotational speed at which said first fan motor causes said fan to rotate.

6. The fan motor assembly of claim 4 wherein said fan motor performance monitoring unit comprises:
   a current measuring device configured to determine the amount of current used by said first fan motor.

7. The fan motor assembly of claim 4 wherein said fan motor performance monitoring unit comprises:
   a comparator configured to compare a measured performance characteristic of said first fan motor with a specified fan motor performance requirement.

8. A fan motor assembly configured to provide integrated redundant fan motor availability, said fan motor assembly comprising:
   a fan motor subassembly comprising a first fan motor and a second fan motor;

a fan motor selector mechanism coupled to said fan motor subassembly, said fan motor selector mechanism configured to selectively dispose said first fan motor or said second fan motor in an orientation for driving a fan;

a control unit coupled to said fan motor selector mechanism, said control unit configured to control said fan motor selector mechanism such that either of said first fan motor and said second fan motor is disposed in said orientation for driving said fan.

9. The fan motor assembly of claim 8 wherein said fan motor subassembly is configured to be removably coupled with said fan motor assembly.

10. The fan motor assembly of claim 9 wherein said fan motor subassembly is selectively driven by either said first fan motor or said second fan motor.

11. The fan motor assembly of claim 8 wherein said control unit further comprises:

a fan motor performance monitoring unit configured to determine a performance characteristic of said first fan motor removably coupled to a first fan motor receptacle.

12. The fan motor assembly of claim 11 wherein said fan motor performance monitoring unit comprises:

a tachometer configured to determine the rotational speed at which said first fan motor causes said fan to rotate.

13. The fan motor assembly of claim 11 wherein said fan motor performance monitoring unit comprises:

a current measuring device configured to determine the amount of current used by said first fan motor.

14. The fan motor assembly of claim 11 wherein said fan motor performance monitoring unit comprises:

a comparator configured to compare a measured performance characteristic of said first fan motor with a specified fan motor performance requirement.

15. A method for providing integrated redundant availability in a fan system, said method comprising:

providing a fan motor subassembly comprising a first fan motor receptacle having a first fan motor coupled thereto and a second fan motor receptacle having a second fan motor coupled thereto wherein said fan motor subassembly is disposed in an orientation for driving a fan with said first fan motor;

monitoring a performance characteristic of said first fan motor;

comparing a measured performance characteristic of said first fan motor with a specified fan motor performance requirement; and provided said measured performance characteristic of said first fan motor does not meet said specified fan motor performance requirement, automatically disposing said fan motor subassembly in an orientation for disengaging said first fan motor from said fan and engaging said fan with said second fan motor.

16. The method for providing redundant availability in a fan system as recited in claim 15 wherein said monitoring of said performance characteristic of said first fan motor comprises using a tachometer to determine the rotational speed at which said first fan motor causes said fan to rotate.

17. The method for providing redundant availability in a fan system as recited in claim 15 wherein said monitoring of said performance characteristic of said first fan motor comprises a current measuring device to determine the amount of current used by said first fan motor.

18. The method for providing redundant availability in a fan system as recited in claim 15 further comprising:

provided said measured performance characteristic of said first fan motor does not meet said specified fan motor performance requirement, enabling removal of said first fan motor after automatically disposing said fan motor subassembly in said orientation for engaging said fan with said second fan motor such that said first motor is removable without interfering with use of said second fan motor to drive said fan.

19. The method for providing redundant availability in a fan system as recited in claim 15 wherein said automatically disposing said fan motor subassembly comprises using said second fan motor to drive said fan motor subassembly such that said second fan motor is engaged with said fan.

* * * * *